US007876472B2

(12) United States Patent
Gudan et al.

(10) Patent No.: US 7,876,472 B2
(45) Date of Patent: Jan. 25, 2011

(54) HANDHELD PRINTER AND METHOD OF OPERATION

(75) Inventors: Ken Gudan, Sunnyvale, CA (US); John Barrus, Menlo Park, CA (US)

(73) Assignee: Ricoh Co. Ltd., Tokyo (JP)

( * ) Notice: Subject to any disclaimer, the term of this patent is extended or adjusted under 35 U.S.C. 154(b) by 1140 days.

(21) Appl. No.: 11/549,086

(22) Filed: Oct. 12, 2006

(65) Prior Publication Data

US 2008/0144053 A1 Jun. 19, 2008

(51) Int. Cl.
*G06K 15/00* (2006.01)
*G06K 15/02* (2006.01)
*B41J 3/36* (2006.01)

(52) U.S. Cl. .................... 358/1.18; 358/1.11; 358/1.12; 358/1.13; 358/1.14; 358/1.15; 358/1.16; 358/1.17; 347/109

(58) Field of Classification Search ......... 358/1.1–1.18; 348/207.99; 347/109; 156/384; 400/88
See application file for complete search history.

(56) References Cited

U.S. PATENT DOCUMENTS

RE30,697 E * 8/1981 Hamisch, Jr. ............... 156/384
4,947,262 A 8/1990 Yajima et al.
4,949,283 A 8/1990 Yamauchi et al.
5,887,992 A 3/1999 Yamanashi
5,927,872 A 7/1999 Yamada
5,988,900 A 11/1999 Bobry
6,229,565 B1 * 5/2001 Bobry ................... 348/207.99
6,338,555 B1 * 1/2002 Hirose ........................ 347/109
6,357,939 B1 * 3/2002 Baron ......................... 400/88

(Continued)

FOREIGN PATENT DOCUMENTS

JP 09-286139 A 4/1997

(Continued)

OTHER PUBLICATIONS

"Design Runner™," Xyron, Inc., 2005, 2 pages.

(Continued)

*Primary Examiner*—James A Thompson
*Assistant Examiner*—Satwant K Singh
(74) *Attorney, Agent, or Firm*—Patent Law Works LLP

(57) ABSTRACT

A handheld portable printer includes a top member, a front member, a bottom member and a handle that are joined together to form a generally O-shaped device. The top member defines a hole through which a scroll dial protrudes and is adapted to support a retractable display on its top surface. The front member provides an area for storing consumables, a battery, and houses a projector to project an image on the print surface of the image to be printed. The bottom member houses optical sensors to detect and measure movement of the handheld printer; and a print head for outputting ink on the print surface. The handle provides additional buttons for inputting command to lock an image or begin printing, and in one embodiment housing electronics for control and projection of the image to be printed, providing user feedback, and communicating with other devices. The present invention also includes a number of novel methods including: a method for printing an image with a handheld printer, a method for projecting an image to be printed, and a method for registering a location of a printer and portions of a printed image.

38 Claims, 10 Drawing Sheets

U.S. PATENT DOCUMENTS

| | | | |
|---|---|---|---|
| 6,543,893 B2 * | 4/2003 | Desormeaux | 347/109 |
| 6,618,078 B1 * | 9/2003 | Budrys | 348/207.99 |
| 6,674,543 B2 | 1/2004 | Day et al. | |
| 2002/0171731 A1 | 11/2002 | Saund | |
| 2003/0081270 A1 | 5/2003 | Hoshino et al. | |
| 2004/0101337 A1 | 5/2004 | Woodman et al. | |
| 2004/0109034 A1 | 6/2004 | Brouhon | |
| 2005/0018033 A1 | 1/2005 | Walling | |
| 2005/0135857 A1 | 6/2005 | Saund et al. | |
| 2005/0231739 A1 | 10/2005 | Lee et al. | |
| 2008/0055384 A1 * | 3/2008 | Noe et al. | 347/109 |

FOREIGN PATENT DOCUMENTS

| | | |
|---|---|---|
| JP | 09-156163 A | 6/1997 |
| WO | WO 00/29221 A1 | 5/2000 |
| WO | WO 01/94118 A1 | 12/2001 |

OTHER PUBLICATIONS

"RMPT Full," Print Dream™, 1 page, 2001-2006, [online] [Retrieved on Jan. 16, 2007] Retrieved from the Internet<URL:http://www.printdreams.com/technology/rmpt_full/>.

"Xyron Design Runner," Xyron, [online] [Retrieved on Jan. 16, 2007] Retrieved from the Internet<URL: http://www.xyron.com/enUS/Products/Xyron_Design_Runner.html>.

European Search Report, European Application No. 07118277.8, Dec. 21, 2007, 7 pages.

* cited by examiner

HANDHELD PRINTER AND METHOD OF OPERATION

BACKGROUND OF THE INVENTION

1. Field of the Invention

The present invention relates to printing devices, and in particular, to a handheld portable printer and a method of operation.

2. Description of the Background Art

Printers are well known in the art and there are a variety of different types such as laser printers, dot-matrix printers and ink jet printers. Each of these printers uses a different type of technology for applying the "ink" to the print media ("paper"). However, most all printers require that the print media be moved past a relatively stationary print head that applies the "ink" to the print media. Most often such printers have a housing for holding the print head in a fixed orientation and complex paper handling trays and mechanisms to feed the print media past the print head and render the printed output. Since most printers require such a large housing, such printers are not hand held, but rather large devices significantly greater in size than a standard sheet of 8×11" sheet of paper. While there have been some printers created for a mobile computing environment, such printers often have a print head or print head mechanism that is at least 8.5 inches in length.

There have been attempts in the prior art to provide a hand held printer. These attempts include a typical approach of reducing the size of the print head so that it can be mounted within a portable housing along with electronics, the power supply and other elements of a printer. However, existing hand-held printers have significant limitations. For many existing hand-held printers, the size of the image that they are able to print is severely limited. For example, some prior art printers are able to print only while they are stationary, and thus, are limited to printing images less than or equal to the printer itself or the print head, which in either case is less that a few inches square. This also makes the printer bulky and difficult to use.

Other handheld printers allow printing while the user moves or "swipes" the handheld printer across or over the print media. However, these printers are again limited in at least one dimension in the size of the images they are able to print. Specifically, they are only able to print an image less than or equal to the size of the print head, and most are limited to one pass or swipe. For those handheld printers that are able to print in sections, it is very difficult to align the multiple, separate printing steps, swipes or sections. Moreover, some printers allow images to be printed in multiple sections require special paper, registration marks or require starting printing at an edge boundary. Furthermore, there is a high misprinting or failure rate with such multiple section hand-held printers. For example, failure to print the image properly often occurs if the user prematurely removes the printing device from the surface of the print medium.

Therefore, what are needed are a handheld portable printer and a method of operation that are easier to use, and are capable of printing images on surfaces regardless of the size of the printed image.

SUMMARY OF THE INVENTION

The present invention overcomes the deficiencies and limitations of the prior art by providing a handheld portable printer and a method of operation. In one embodiment, the handheld portable printer includes a top member, a front member, a bottom member and a handle that are joined together to form a generally O-shaped device. The top member defines a hole through which a scroll dial protrudes and is adapted to support a retractable display on its top surface. The front member provides a more rigid and strong structure, provides an area for storing consumables and the battery and houses a projector to project an image on the print surface of the image to be printed. The bottom member tapers outward to provide increased ability as the handheld printer is moved across a print medium. The bottom member houses optical sensors to detect and measure movement of the handheld printer; rollers to assist in movement of the printer over the print surface; and a print head for outputting ink on the print surface. The handle provides additional buttons for inputting commands to lock an image or begin printing, and in one embodiment housing electronics for control and projection of the image to be printed, providing user feedback, and communicating with other devices. The present invention also includes a number of novel methods including: a method for printing an image with a handheld printer, a method for projecting an image to be printed, and a method for registering a location of a printer and portions of a printed image.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

A handheld printer and a method for using same are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to printing documents for reading. However, the present invention applies to any type of printing including electronic circuits, partially invisible printing for marking and various other printing techniques.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Moreover, the present invention claimed below may operate on or work in conjunction with an information system or network. For example, the invention can operate as a stand alone printer or communicate with a network with additional functionality varying depending on the configuration. Thus, the present invention is capable of operating with any information system from those with minimal functionality to those providing all the functionality disclosed herein.

Figure 1:
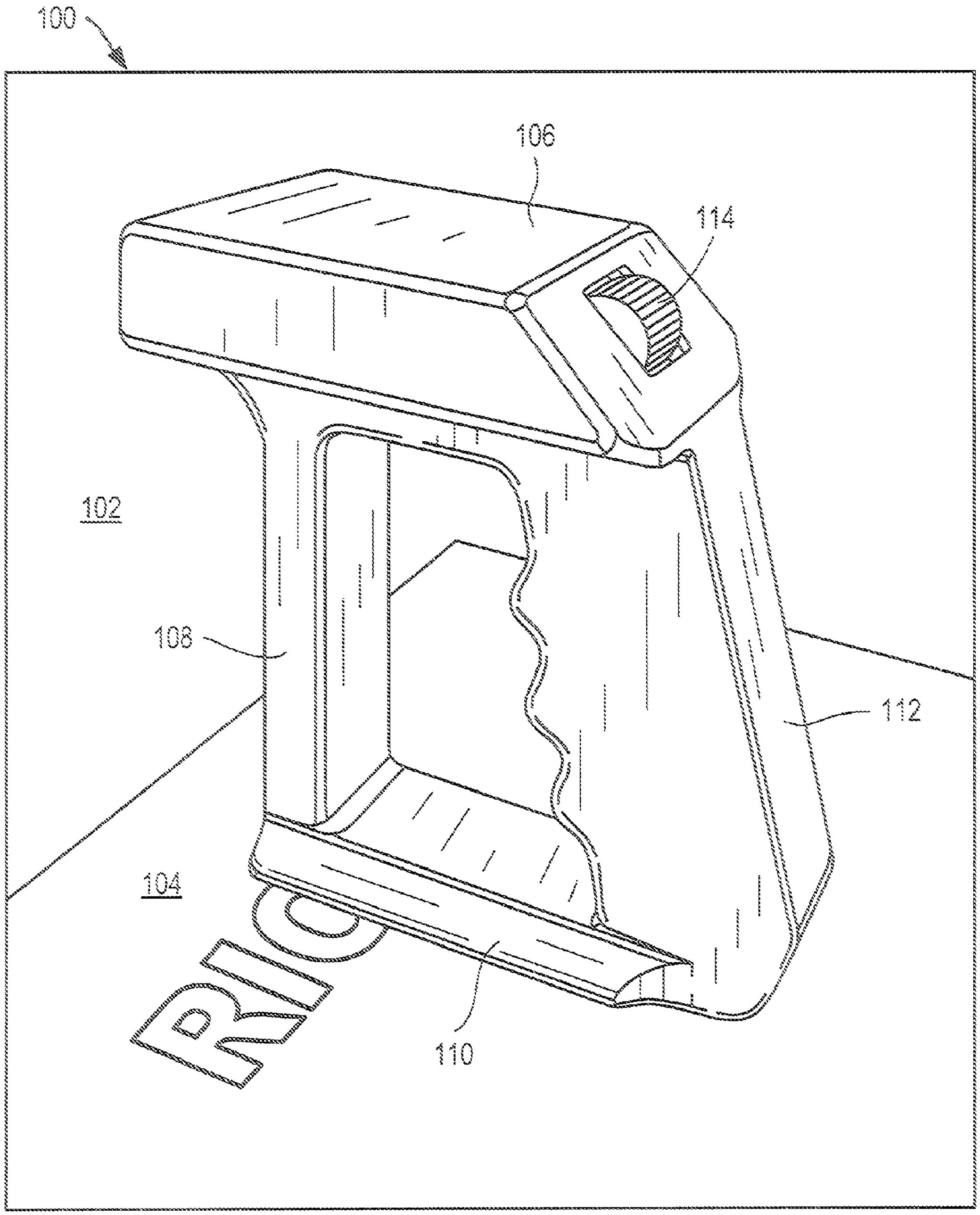
FIG. 1 is an upper, rear perspective view of a first embodiment of the handheld printer according to the present invention.

Referring now to FIG. 1, a first embodiment of the handheld printer 100 is shown. More specifically, FIG. 1 shows the handheld printer 100 in the middle of a print operation on a print medium 104 such as piece of paper placed on a flat surface 102. The handheld printer 100 includes a portable housing comprised of a top member 106, a front member 108, a bottom member 110 and a handle 112. These members 106, 108, 110 and 112 are joined together to form a generally O-shaped device. In another embodiment, the handheld printer 100 has a sideways U-shape without a front member 108. These shapes are provided only by way of example, as long as there is structure that is small in proportion to be handheld and offers areas for functionality that will be described above, various other structures are encompassed within the claimed invention. Each of these members 106, 108, 110 and 112 has a generally rectangular shape and different sizes as will be described in more detail below. The top member 106 has a generally rectangular shape with its rear side tapered to define a rectangular hole through which the scroll dial 114 protrudes. The top member 106 has an increased width at the top adapted for placement of a retractable display 120 (see FIGS. 2 and 4) upon this top surface. The handle 112 connects to the rear portion of the top member 106 to the rear portion of the bottom member 110. The handle 112 is sized and shaped such that it can be grasped by the human hand, such as about an inch in width and 3-4 inches in length. In particular, in one embodiment, the front wall of the handle 112 has four protrusions that define concave areas for receiving the user's fingers. The bottom member 110 has a width similar to the front member 108 and the handle 112. However, the bottom member 110 tapers outward to provide increased stability for movement of the handheld printer 100 across the paper 104 or other planar surface. The front member 108 couples the bottom member 110 to the top member 106 proximate the front of each member 106, 110. The front member 108 is provided to give the handheld printer 100 a more rigid and strong structure as well as to provide an area for storing consumables 808 (see FIG. 8) or electronics 804 (see FIG. 8).

Figure 2:
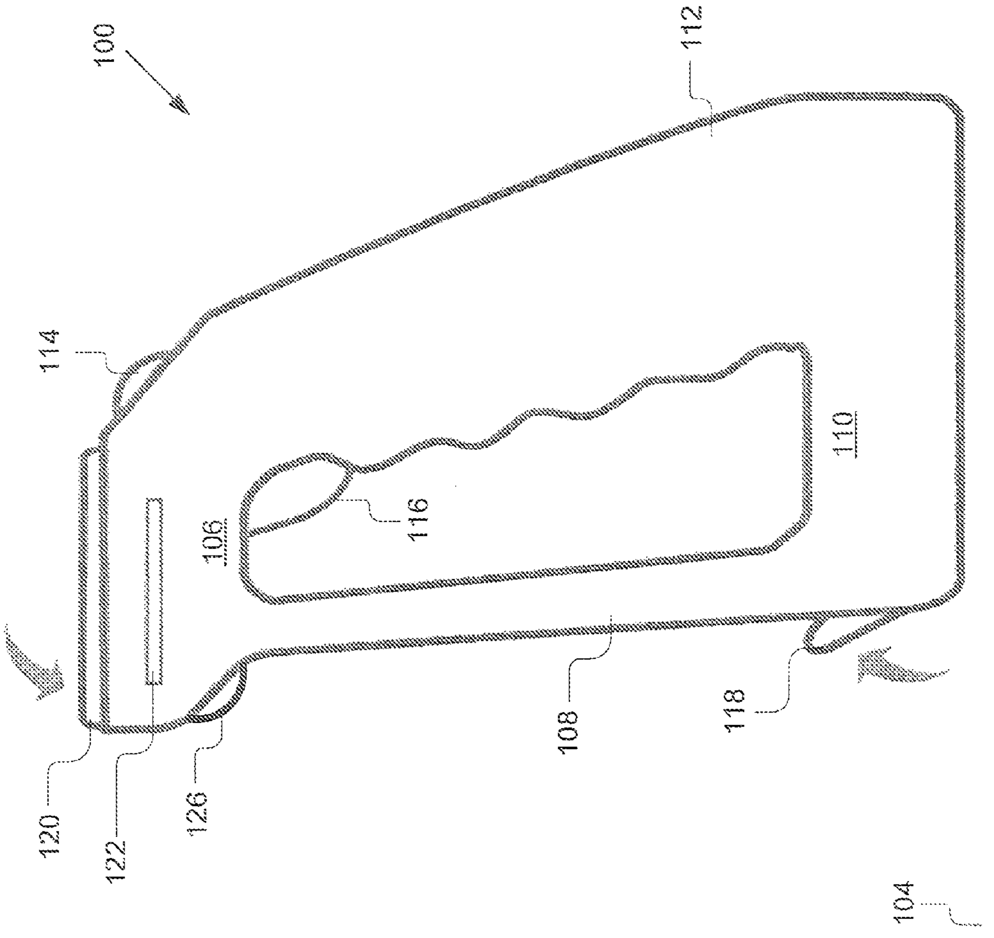
FIG. 2 is a side view of the first embodiment of the handheld printer according to the present invention with a display in a retracted position and a print head transitioning from a print position to a retracted position.

Referring now also to FIG. 2, the first embodiment of the handheld printer 100 will be described in more detail. FIG. 2 shows a side view of the handheld printer 100 in a nonprinting mode. This side view shows the scroll dial 114 as protruding from the rear side of the top member 106. The side view also shows how the top member 106 defines a slot 122 adapted to receive and couple with any portable media device 150.

A portable media device 150 includes a memory card like a SD card, CompactFlash card or MD card as is typically used in digital cameras or portable music players; or a MediaKey which is a card containing an image and a barcode. The barcode has an ID and an encryption key that can be used to access and decrypt media stored on the Internet. In other words, you can read the barcode on a (codename) MediaKey and download an encrypted image or document, decrypt it, and print it using the handheld printer.

FIG. 2 also shows the retractable display 120 in the retracted position, which is disposed flat upon the top surface of the top member 106. For example, the retractable display 120 could be coupled to the top member 106 by a spring loaded hinge mounted toward the rear top side of the top member 106 and the bottom rear side of the retractable display. FIG. 2 also illustrates a print button 116 that extends forward in a hole defined in part by the top member 106 and in part by the handle 112. The user can press the print button 116 using their index finger while at the same time holding and/or moving the handheld printer 112. Specifically, the button 116 is similar in design to a trigger on a gun. Proximate the front of the bottom member 110, a cavity is defined to house the print head 118. FIG. 2 illustrates the print head 118 in a transition from a first, printing position to a second retracted position. Finally, a projector 126 is disposed proximate the front side of the top member 106. The projector 126 is capable of projecting an image on the paper 104 or the surface 102. In one embodiment, the image projected by the projector 126 is adjustable responsive to user manipulation of the scroll dial 114. The projector 126 may be any one of a conventional type such as provided by a micro-projector; a projector by Blue Light Optics of Cambridge, England; and a MEMS laser projection module by Fraunhofer.

Figure 3:
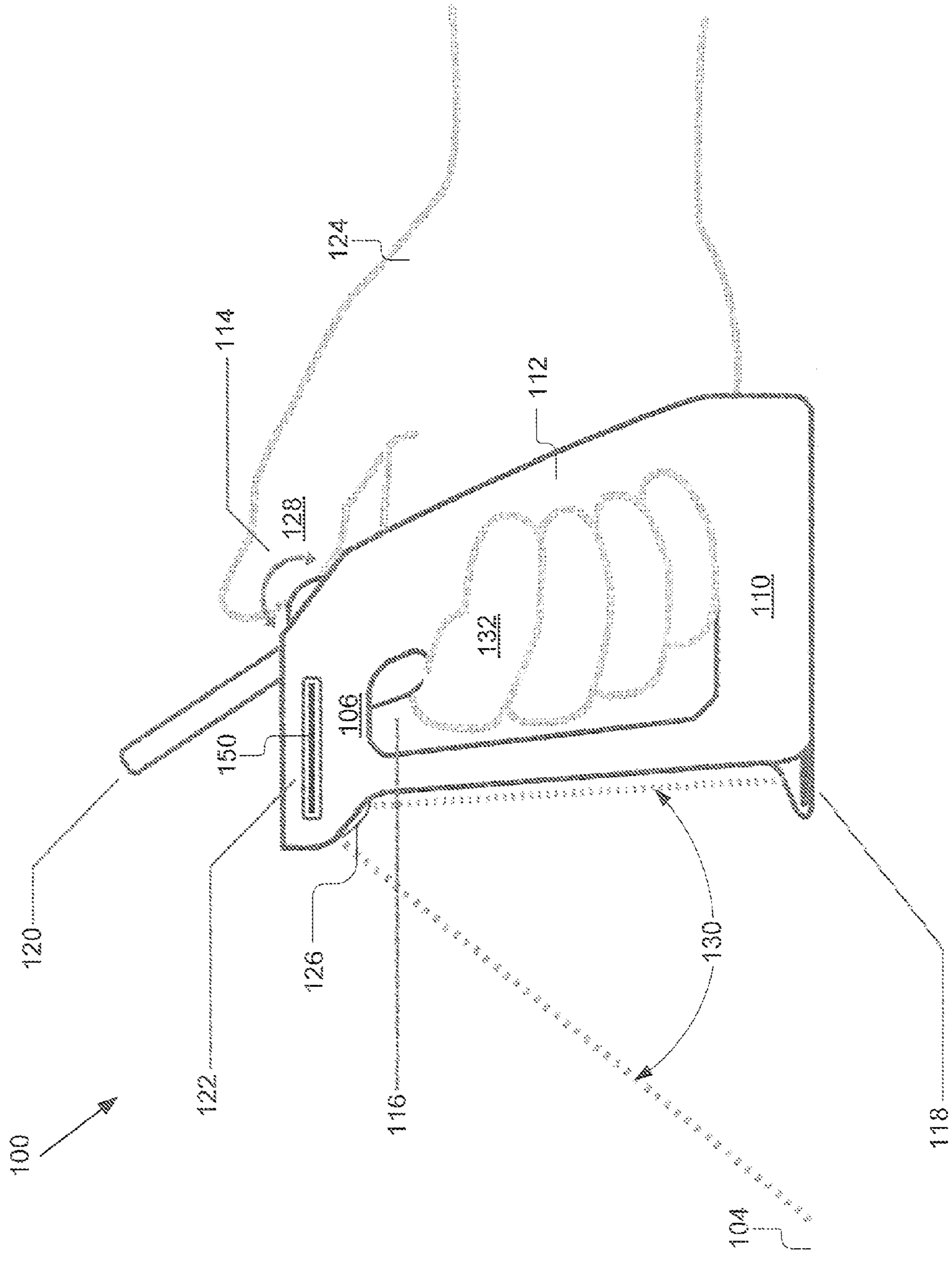
FIG. 3 is a side view of the first embodiment of the handheld printer according to the present invention with a display in a second position and the print head in the first position.

Referring now to FIG. 3, an embodiment of the handheld printer 100 in a printing mode is shown. FIG. 3 also shows a user's hand 124 and how it interacts with the handheld printer 100. In the printing mode, the display device 120 moves from the retracted position adjacent to the top surface of the top member 106 to an angled position where the angle between the top surface of the top member 106 and the bottom surface of the display device 120 is an acute angle. Repositioning the display device 120 at the angled position makes the display more easily viewable by the user. The user uses their thumb 128 to manipulate the scroll dial 114. The scroll dial 114 can be rolled forward or backward by the user's thumb 128 to adjust the size and position of the projected image. In contrast to FIG. 2, the print head 118 is fully extended and its front edge is adjacent to the paper 104 to apply ink. As illustrated by the dotted lines 130, the projector 126 of the handheld printer 100 advantageously projects an image on the paper 104 with the boundaries depicted by the dotted lines 130. During the print operation, the user uses their index finger 132 to depress the print button 116. In response to selection of the print button 116, the handheld printer 100 outputs ink via the print head 118 on the paper 104. In one embodiment, the print button 116 has two positions, a first position, partially depressed at which the projected image is "locked." In the "locked" mode, the printer 100 adjusts the appearance of the image projected to account for movement of the printer 100, so that regardless of the movement the projection onto the paper 104 has a constant appearance. If the user continues to depress the print button 116 to a second position, the projection continues be "locked" but the printer also performs the printing operation and outputs ink.

Figure 4:
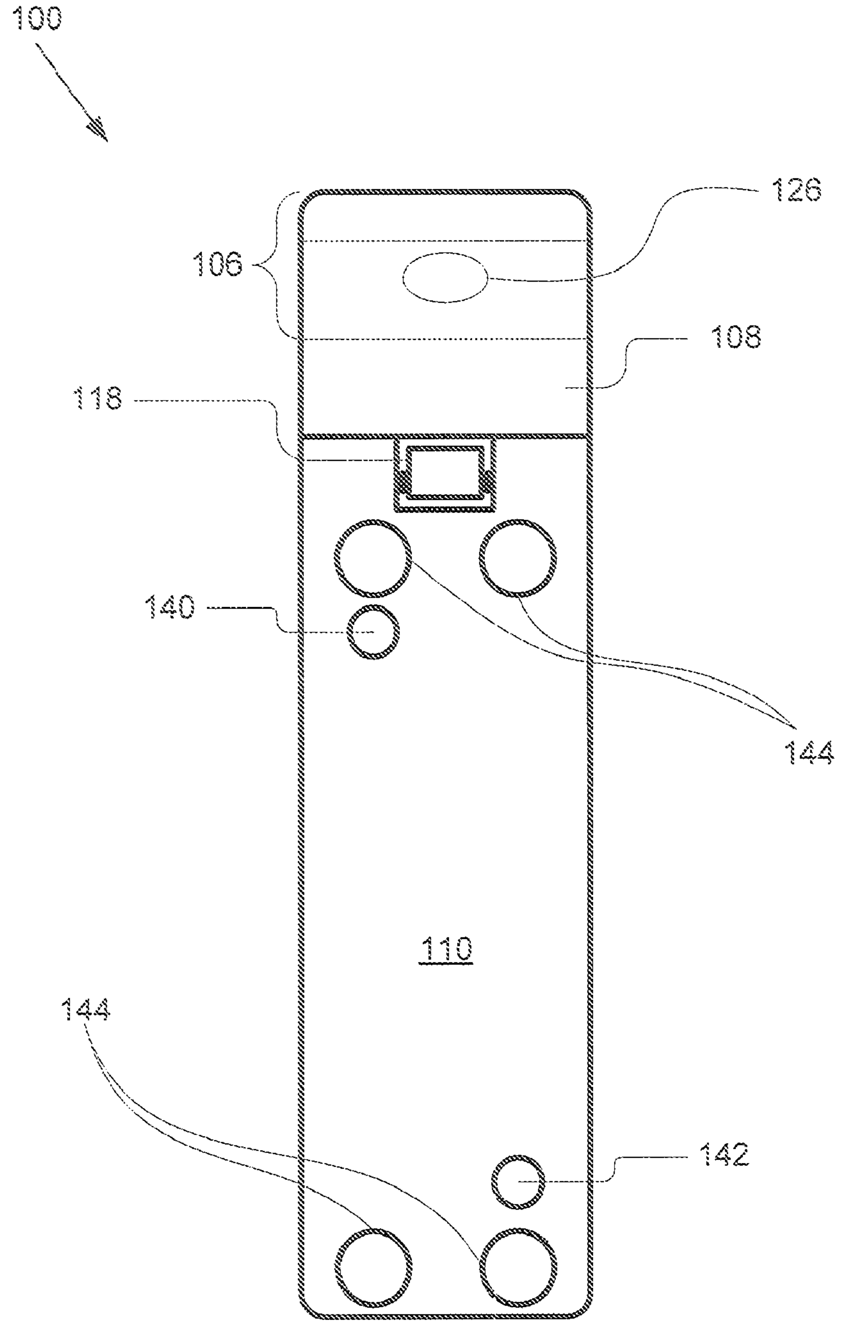
FIG. 4 is a bottom plan view of the first embodiment of the handheld printer according to the present invention.

Referring now also to FIG. 4, a bottom plan view of the handheld printer 100 is shown. The bottom plan view of the handheld printer 100 shows the bottom of the bottom member 110, the front side of the front member 108 and a portion of the bottom of the top member 106. It should be noted that FIG. 4 illustrates the print head 118 in the retracted position. In the print position, the print head 118 would extend into an area shown in FIG. 4 as the front member 108. As can be seen from FIG. 4, the bottom member 110 defines a plurality of apertures for position detection sensors 140, 142, rollers 144 and the print head 118. The handheld printer 100 advantageously provides a plurality of rollers 144 so that the handheld printer 100 may be placed upon the print medium 104 or other planar surface and moved easily across it. In this embodiment, the handheld printer 100 has four rollers positioned proximate the corners of the bottom side of the bottom member 110. The position detection sensors 140, 142 are optical sensors. In this embodiment, two optical sensors 140, 142 are provided. The first optical sensor 140 is positioned on the bottom of the bottom member 110 proximate the front left side. The second optical sensor 142 is positioned on the bottom of the bottom member 110 proximate the rear right side. The sensors 140, 142 are provided so that the movement of the handheld printer 100 across the surface 102 or print medium 104 can be detected and the projection of the image being printed can be adjusted when in the "locked" mode. The aperture for the print head 118 is provided centered along the front edge of the bottom member 110.

Figure 5:
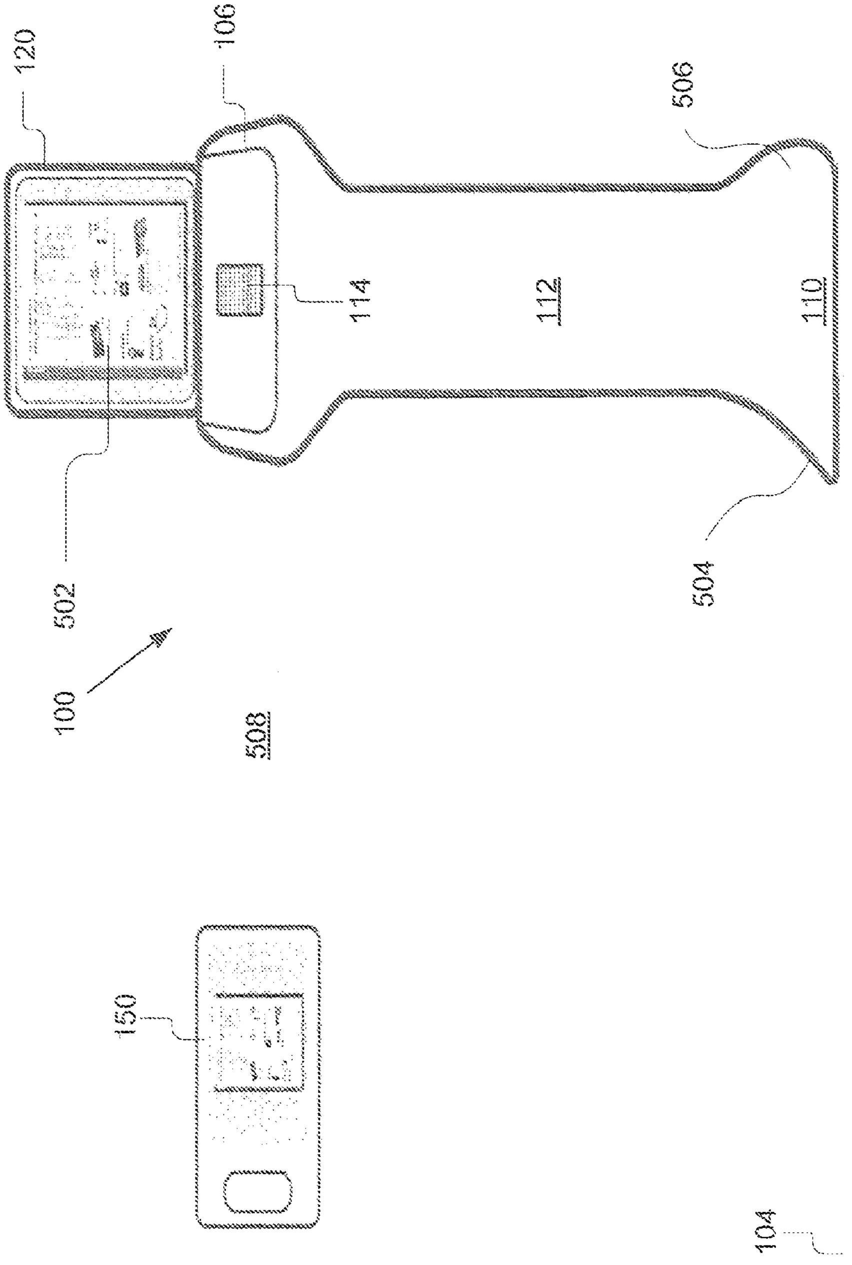
FIG. 5 is a rear side plan view of the first embodiment of the handheld printer according to the present invention.

Referring now to FIG. 5, a rearview of the handheld printer 100 is shown. For illustration purposes, a portable media device 150 shown. As illustrated by the arrow 508, the portable media device 150 can be inserted into slot 122 on the left side of the top member 106 of the handheld printer 100 (See also FIGS. 2 and 3). The portable media device 150 can include any image or data to be printed by the handheld printer 100. The portable media device 150 is just one example of a method for transferring print data from an external source to the handheld printer 100. FIG. 5 also illustrates the retractable display device 120 in the angled position. More specifically, the display device 120 shows any exemplary image 502 of the document to be printed. FIG. 5 also illustrates one embodiment of the left or trailing side 504 of the bottom member 110 and the right or front side 506 of the bottom member 110. These sides 504, 506 are advantageously shaped to provide increased ability when moving the handheld printer 100 across the surface 102 or print medium 104. The handheld printer 100 can be swept in either direction, and probably will be swept in both directions, during a single print and it is designed to be capable of such motion.

Although not shown by the exterior of the handheld printer 100 in this embodiment, the handheld printer 100 may also include other components such as communication devices such as wireless transceivers, USB and Bluetooth® transceivers, Infrared transceivers or image capture devices like a camera.

Figure 6:
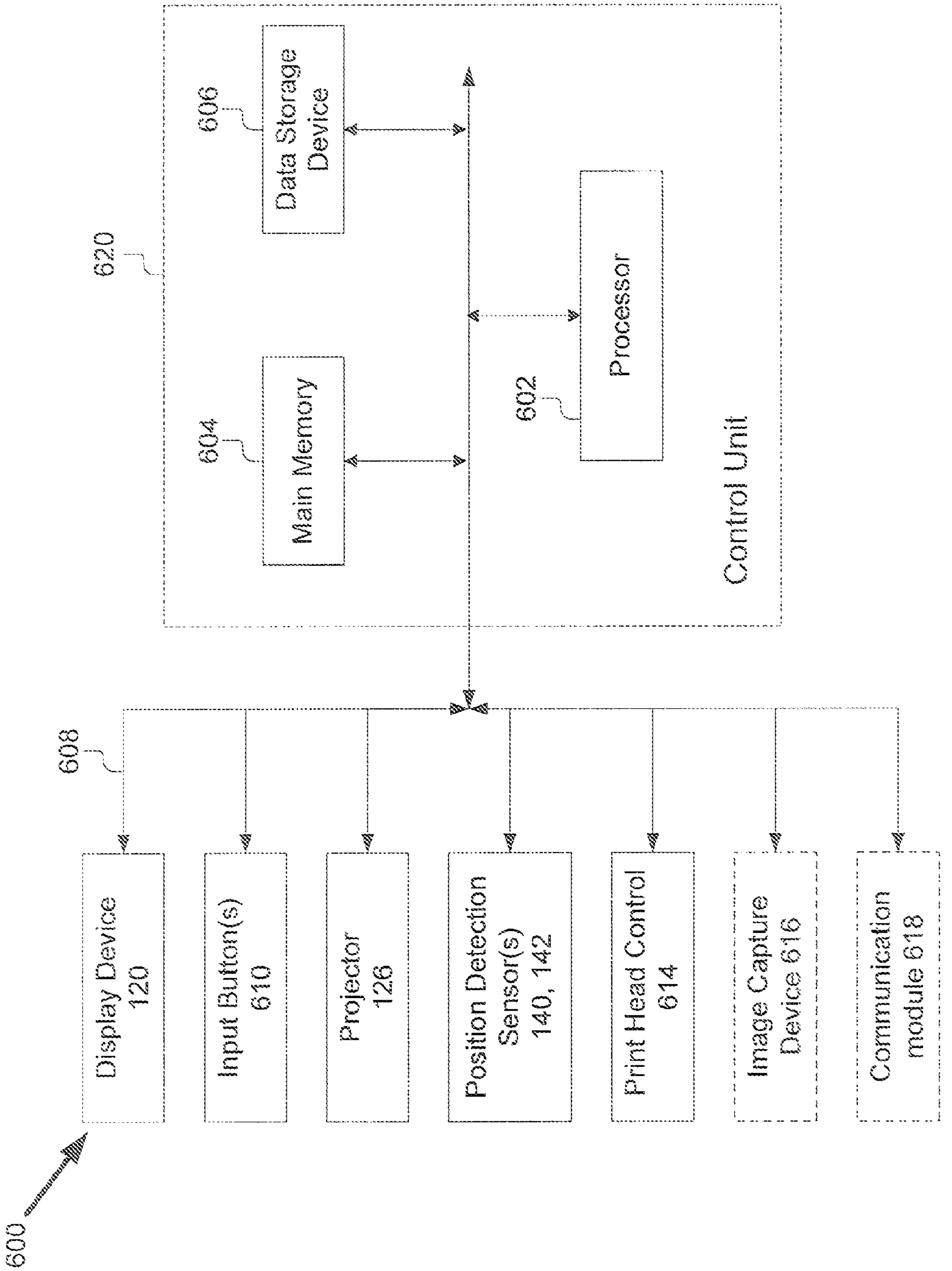
FIG. 6 is a block diagram of one embodiment of a computing system of the handheld printer in accordance with the present invention.

FIG. 6 is a block diagram of one embodiment of the computing system 600 housed by the handheld printer 100 and performing the methods of the present invention. The computing system 600 preferably comprises a control unit 620, a display device 120, one or more input buttons 610, the projector 126, position detection sensors 140, 142, and a print head control module 614. In other embodiments, the computing system 600 includes a camera or other image capture device 616, and a communication module 618 including transceivers or connectors.

The control unit 620 is shown including processor 602, main memory 604, and data storage device 606, all of which are communicatively coupled to system bus 608.

The processor 602 processes data signals and may comprise various computing architectures including a complex instruction set computer (CISC) architecture, a reduced instruction set computer (RISC) architecture, or an architecture implementing a combination of instruction sets. Although only a single processor is shown in FIG. 6, multiple processors may be included. The processor 602 comprises an arithmetic logic unit, a microprocessor, a general purpose computer, or some other information appliance equipped to provide electronic display signals to display device 120.

Main memory 604 stores instructions and/or data that may be executed by processor 602. The instructions and/or data may comprise code for performing any and/or all of the techniques described herein. Main memory 604 may be a dynamic random access memory (DRAM) device, a static random access memory (SRAM) device, Flash RAM (non-volatile storage), combinations of the above, or some other memory device known in the art. The memory 604 is described in more detail below with reference to FIG. 7.

Data storage device 606 stores data and instructions for processor 602 and comprises one or more devices including a hard disk drive, a flash memory device, or some other mass storage device known in the art. In an alternate embodiment, data storage 606 may be replaced by a connection to an external data storage unit.

The system bus 608 represents a shared bus for communicating information and data throughout control unit 620. System bus 608 may represent one or more buses including an industry standard architecture (ISA) bus, a peripheral component interconnect (PCI) bus, a universal serial bus (USB), 12C, SPI, or some other bus known in the art to provide similar functionality. Additional components coupled to control unit 620 through system bus 608 include the display device 120, one or more input buttons 610, the projector 126, the position detection sensors 140, 142, the print head control module 614, the image capture device 616, and the communication module 618.

Display device 120 represents any device equipped to display electronic images and data as described herein. Display device 120 may be, for example, an organic light emitting diode display (OLED), liquid crystal display (LCD), or any other similarly equipped display device, screen, or monitor. In one embodiment, display device 120 is equipped with a touch screen in which a touch-sensitive, transparent panel covers the screen of display device 120. As has been noted above, in the preferred embodiment, the display device 120 is an OLED panel sized to the top member 106, and mounted for retractable positioning. In other embodiments, the display device may be a series of LEDs or other lights that indicate the status of the handheld printer 100.

The one or more input buttons 610 are any device to provide user input to the handheld printer 100 such as switches, cursor controller or a keyboard. In one embodiment, the input buttons include a print button 116, a scroll dial 114, a power button 812, a menu button 814 and a scaling knob 816. In one embodiment, the input buttons 610 can include an alphanumeric input device, such as a QWERTY keyboard, a key pad, or representations of such created on a touch screen, coupled to control unit 620 to communicate information and command selections to processor 602. In another embodiment, the input button 610 is a user input device equipped to communicate positional data as well as command selections to processor 602 such as a joystick, mouse, a trackball, a stylus, a pen, a touch screen, cursor direction keys, or other mechanisms to cause movement adjustment of an image.

The projector 126 outputs an image provided by the control unit 620. The projector 126 is capable of modifying the size and position of the image in response to signals from the control unit 620. The projector 126 is mounted to the portable housing of the handheld printer 100 as has been described above. The projector 126 is electrically coupled to the control unit 620 by bus 608. The projector 126 may be any one of a conventional type such as a micro-projector; a projector by Blue Light Optics of Cambridge, England; and a MEMS laser projection module by Fraunhofer. Moreover, the projector 126 is mounted to the housing of the handheld printer 100 so that its angle with respect to the target surface remains fixed as the printer 100 is rolled or slid along the surface 104.

The position detection sensors 140, 142 are coupled to the control unit 602 by the bus 608. One embodiment of the position detection sensors 140, 142 has been described above as optical sensors. While a plurality of sensors 140 and 142 are shown, those skilled in the art will recognize that other embodiments use only a single position detection sensor 140 that measures three degrees of freedom, including X and Y position and angular orientation. The position detection sensors 140 and 142 are used to track movement of the handheld printer 100 across the surface 102 or paper 104. The position detection sensors 140, 142 generate signals that are processed by processor 602 to determine an X-Y position of the handheld printer 100 on the surface 102 and include direction, speed and rotation of the handheld printer 100. This X-Y position data is used by the projection system to adjust the image projection information, and by the printing system to know where to drop ink material.

The print head control module 614 is coupled for the communication with the print head 118 and is used to control printing. More specifically, the print head control module 614 reformats and send signals to the print head 118 that cause it to move from the retracted position to the operational position, and vice versa. The print head control module 614 also signals to the print head 118 when to mark the print medium 104. Furthermore, the print head control module 614 can also be used as an interface to provide feedback to the processor 602 as to a printer head 118 malfunction or when consumables have run out, so that the user may be notified via the display device 120.

The image capture device 616 is preferably a digital camera and lens housed within the handheld printer 100. The image capture device 616 is coupled by bus 608 to send and receive control and status signals and to send captured images. For example, the image capture device 616 may include zoom, auto-focus and other camera capabilities. The image capture device 616 is any one of a conventional type such as those currently available in cellular phones and other small form factor devices, such as the ES2196M from ESS Technology, Inc. In one embodiment, the image capture device also includes an image processor (not shown). The image processor is used to detect a portion of the image that has been printed, and the image processor adapted for communication with the image capture device 616 and the control unit 620/processor 602. The image capture device 616 can be used to capture an image of the surface 104 and the image processor compares it to a source image. The difference between the captured image and the source image can then be used as an input to control marking of the surface 104.

The communication module 618 links control unit 620 to a network (not shown) and other processing systems. The network of processing systems may comprise a local area network (LAN), a wide area network (WAN) (e.g., the Internet), and/or any other interconnected data path across which multiple devices may communicate. In one embodiment, the communication module 618 is other conventional connections such as Ethernet, USB, etc. to other systems such as a network for distribution of files and information using standard network protocols such as TCP/IP, http, https, and SMTP as will be understood to those skilled in the art. One specific example has been described above as a portable media device slot/interface 122. In another embodiment, the communication module 618 is any one of conventional type of transceiver such as for Infrared communication, WiFi communication, 802.11abg communication, Bluetooth® communication, 3G communication, or radio frequency communication. Those skilled in the art will recognize that other devices can be coupled to the bus 608 for interaction with the processor 602 in a variety of conventional ways.

It should be apparent to one skilled in the art that computing system 600 may include more or less components than those shown in FIG. 6 without departing from the spirit and scope of the present invention. For example, computing system 600 may include additional memory, such as, for example, a first or second level cache, or one or more application specific integrated circuits (ASICs). Similarly, additional components input/output devices may be coupled to control unit 620 including, for example, an RFID tag reader, digital still or video cameras, or other devices that may or may not be equipped to capture the target surface or portion of the document that has been printed. One or more components could also be eliminated such as camera 616 or communication module 618.

Figure 7:
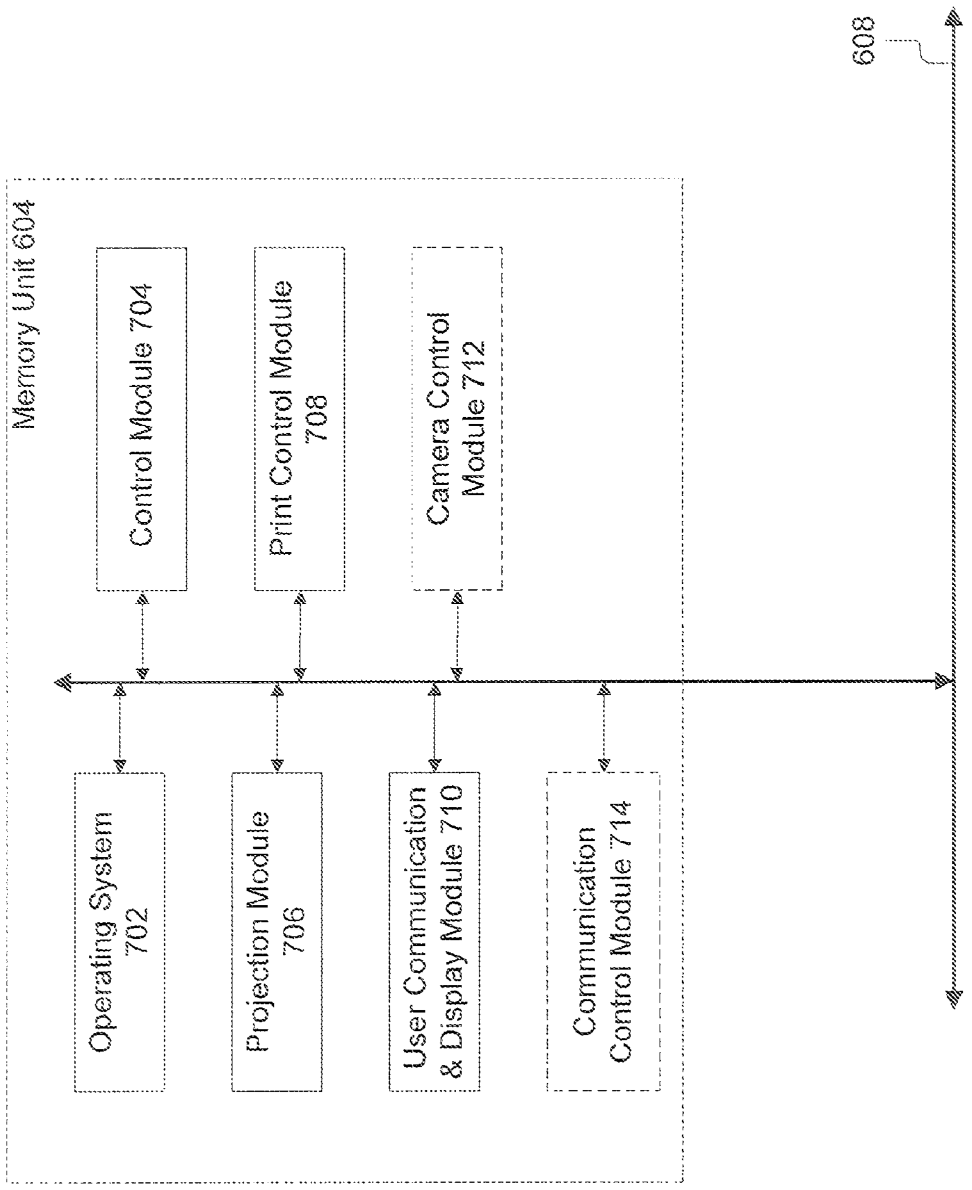
FIG. 7 is a block diagram of one embodiment of a memory for the computing system of the handheld printer in accordance with the present invention.

FIG. 7 is a block diagram of one embodiment of the memory unit 604 for the control unit 620. The memory unit 604 for the control unit 620 preferably comprises: an operating system 702, a control module 704, a projection module 706, a print control module 708, a user communication and display module 710, a camera control module 712, and an communication control module 714. As noted above, the memory unit 604 stores instructions and/or data that may be executed by processor 602. The instructions and/or data comprise code for performing any and/or all of the techniques described herein. These modules 702-714 are coupled by bus 608 to the processor 602 for communication and cooperation to provide the control unit 620. Those skilled in the art will recognized that while the present invention will now be described as modules or portions of a memory unit 604 of a computer system, the modules or portions thereof may also be stored in other media such as permanent data storage device 606 and may be distributed across a network having a plurality of different computers such as in a client/server environment and to which the hand held printer 100 is adapted for communication. Furthermore, those skilled in the art will recognize that the memory 604 includes areas for temporarily storing data and working memory area although not specifically shown.

The operating system 702 is preferably one of a conventional type such as, WINDOWS®, SOLARIS® or LINUX® based operating systems. Although not shown, the memory unit 604 may also include one or more application programs without limitation.

The control module 704 is used to control the other modules of the memory 604. The control module 704 is adapted for communication with the projection module 706, the print control module 708, the user communication and display module 710, the camera control module 712, and the communication control module 714. The operation of the control module 704 will be apparent from the description of FIGS. 8-9 below. The control module 704 is coupled to receive input from the input buttons 610, the position detection sensors 140, 142, camera 616 and communication module 618. The control module 704 also communicates and interacts to transfer data and commands with the display device 120, the projector 126, the print head control 614 and the communication module 618. While the control module 704 is shown as a separate module of the memory 604, those skilled in the art will recognize that the control module 704 in another embodiment may be distributed as routines in the other modules 706-714.

The projection module 706 is software used by the processor 602 for interacting with and controlling the projector 126 of the handheld printer 100. The projector 126 advantageously projects or outputs an image of the document to be printed. The projection module 706 sends the projector 126 signals that form the projected image, signals to adjust or modify the size of the projected image, the position of the projected image, brightness, contrast and other display characteristics by processor 602 responsive to input from the user. The image projected by the projector 126 is controlled by the processor 602 in accordance with the methods of the present invention. For example, using the input buttons 610 the user may adjust the display characteristics of the projector 126 to various different images displayed and seen by the user. In response to a lock input, the handheld printer 100 tracks its movement and automatically adjust the image projected so that is appears the same on the surface 104 as when the lock button 116 is initially depressed even though the position of the handheld printer 100 changes.

The print control module 708 is used to send commands from the user or processor 602 to the print head control 614. More specifically as has been note above, the print control module 708 sends signals to output ink, retract the print head 118 or move the print head to the operational position. The print control module 708 is also used to send status information from the print head 118 to the processor 602 for eventual presentation to the user of the handheld printer 100. The print control module 708 operates in conjunction with the processor 602 and is coupled by bus 608 for communication and interaction with the processor 602. The print control module 708 also optionally tracks and records when ink was output as the handheld printer 100 is moved. Thus, even in the handheld printer 100 is moved over the same point on the surface 104 multiple times to print the image, the print head 118 is selectively activated to output ink only once for a given area of the surface. In other words, regardless of how many times the user drags the handheld printer 100 over a particular region of the surface 104 that shows the locked and projected image, the handheld printer 100 deposits ink only on one pass over the particular region, and not on successive passes. Where ink had been output is monitored by the print control module 708, and the print control module 708 selective turn on and off the print head 118 so to ensure that ink is deposited only on one pass.

The user communication and display module 710 is used to interact with the user and causes information to be displayed on the display device 120, and signals to be received from the input button 610. The user communication and display module 710 is capable of causing an image of the document to be printed to be generated and presented on the display device 120. The user communication and display module 710 is also capable of causing the processor 602 to display operational status information on the display device 120 such as whether the projected image is locked, whether printing is occurring, status of the print head 118 or consumables 808 (See FIG. 8), etc. The user communication and display module 710 also receives and processes signals from the input buttons 610 as has and will be described. These inputs cause initiation of other routines of the present invention.

In the embodiments where an image capture device 616 is included, the memory 604 also includes a camera control module 712. The camera control module 712 is software that allows the processor 602 to control the image capture device 616 and its capabilities including controlling the image that is captured and when the image is captured. In one embodiment, the camera control module 712 also processes the captured image, and stores it in the data storage device 606 or working memory. In another embodiment, the camera control module 712 also performs image processing.

In the embodiments where a communication module 618 is included, the memory 604 also includes the communication control module 714. The communication control module 714 is software adapted for communication with external devices (not shown) using the communication module 618. Regardless of communication format, the communication control module 714 manages the sending and receipt of commands, portions of files, files and data via the communication module 618.

Figure 8:
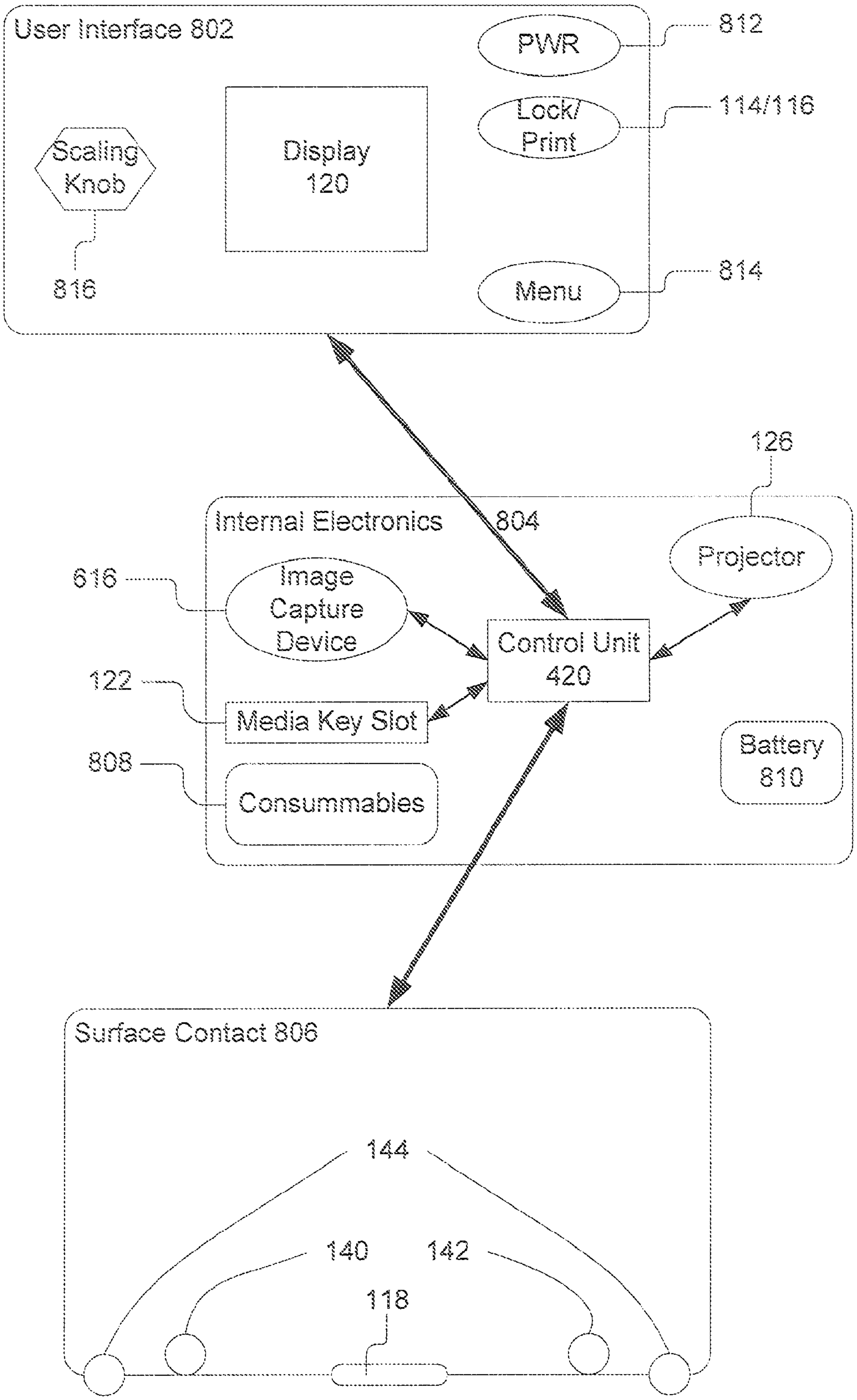
FIG. 8 is a conceptual block diagram of one embodiment of the handheld printer in accordance with the present invention.

Referring now to FIG. 8, a conceptual block diagram of another embodiment of the handheld printer 100 in accordance with the present invention is shown. The conceptual block diagram of FIG. 8 shows the relationships between the different components of the handheld printer 100 described above. More specifically, the user interface 802 for the handheld printer 100 includes a scaling knob 114, the display 120, a power button 812, the lock button 114, the print button 116 and a menu button 814. The display 120, the lock button 116 and the print button 116 have been described above so that description will not be repeated here. The scaling knob 114 allows the user to adjust the size and position of the projected image. In response to manipulation of the scaling knob 114, the processor 602 generates signals to adjust the image and sends them to the projector 126. In this embodiment, the power button 812 is provided to turn the handheld printer 100 on and off. This embodiment also provides a menu button 814 that allows the user to show additional information on the display 120. In response to selection of the menu button 814, the processor 602 shows status information and selectable options on the display device 120. The selectable options can be selected using the scaling knob 816. In yet another embodiment, the scroll dial 114 combines the functionality described above for the scaling knob 816 and the lock button 114. The scroll dial 114 can provide the scaling on input, but also can be pushed inward by the user into the housing of the handheld printer 100 to serve as the lock button 116.

The user interface 802 and its components are adapted for communication with internal electronics 804, in particular, the control unit 620. The internal electronics 804 include the image capture device 616, the portable media device slot 122, consumables 808, the control unit 620/processor 602, the projector 126 and a battery 810. The camera 616, the portable media device slot 122, the control unit 620/processor 602 and the projector 126 have been described above so that description will not be repeated here. The consumables 808 include ink and other material output by the handheld printer 100. The battery 810 is a conventional type, is stored within the housing, and provides power for operation of the computing system 600 and other components.

The internal electronics 804 are adapted for communication and control of surface contact components 806 which include optical sensors 140, 142 rollers 144 and the print head 118. The operation of these components is been described above as well as their interaction with the control unit 620/processor 602.

Figure 9:
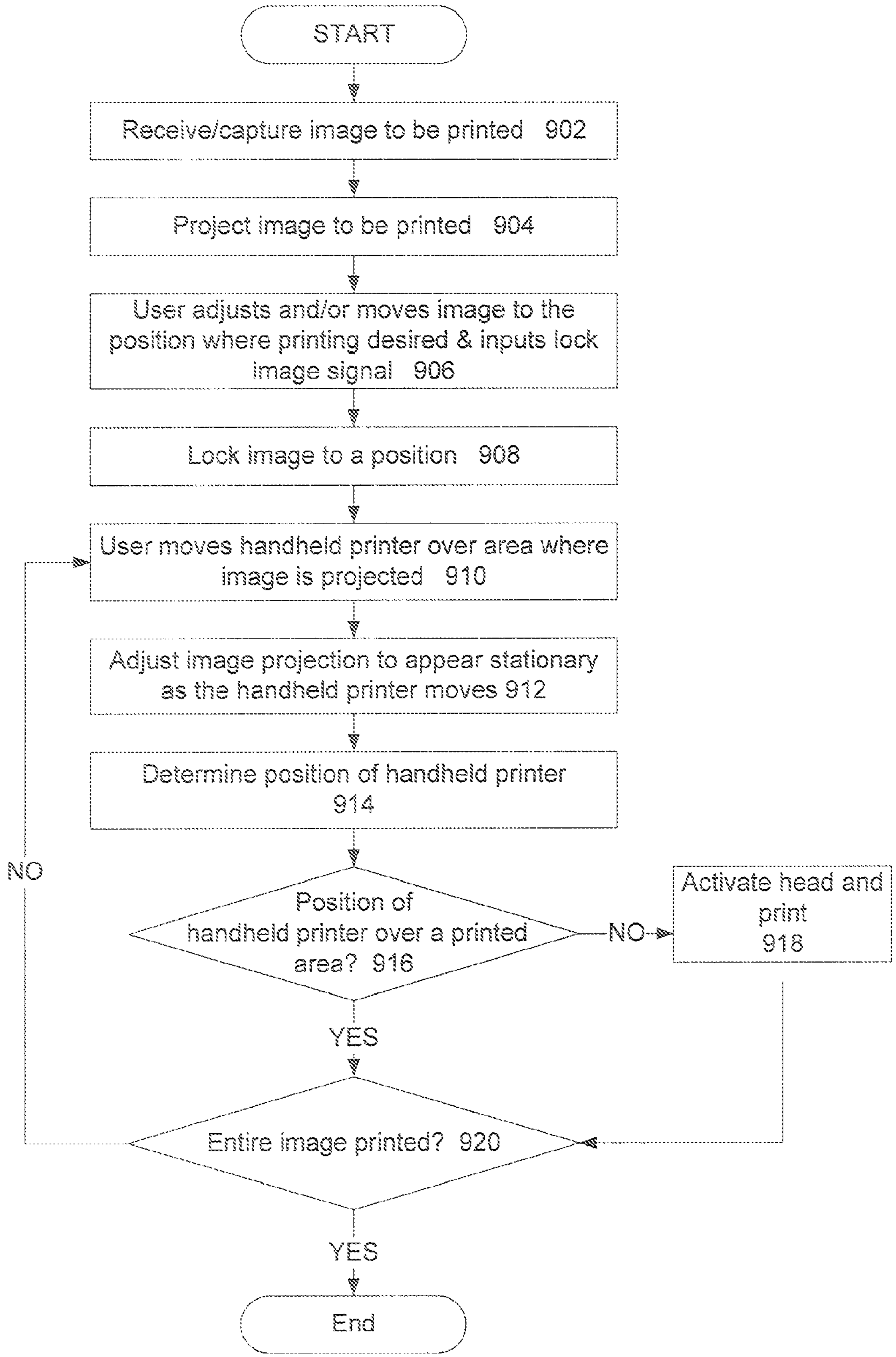
FIG. 9 is a flowchart of an embodiment of a method for printing according to the present invention using the handheld printer.

Referring now to FIG. 9, one embodiment of a method for printing with the handheld printer 100 according to the present invention will be described. The method begins with the handheld printer 100 receiving or capturing 902 an image to be printed. The handheld printer 100 can receive an image to be printed in response to the insertion of the portable media device 150 in the media slot 122. In another embodiment, the handheld printer 100 receives an image to be printed via the communication module 618 such as by coupling a memory card to a USB interface or similar interface, or by transmission of a file over an infrared or Bluetooth link. Additionally, where the handheld printer 100 includes the camera 616, the handheld printer 100 can perform a scan-to-print operation in which the camera 616 captures an image of the surface 104 or document then the handheld printer 100 is moved over a different blank surface and the image that was just captured is printed. Once the image to be printed has been captured or received 902, the method continues by projecting 904 the image to be printed using the projector 126 as illustrated above with reference to FIG. 3. Next, the user can adjust and/or move 906 the projected image to the desired position of where the document should be printed. The user can physically move the handheld printer 100 to adjust the position of the projected image. The user can also use the scroll dial 114, scaling knob 816 or other input buttons 610 to modify how the image is projected such that the projected image is in the desired position of where the document should be printed. Once the projected images in the desired position, the user inputs 906 the lock image signal by selecting one of the input buttons 610 or by pressing the lock/print button 116 half way down. The handheld printer 100 locks 908 the image to position in response. Next, the user moves 910 the handheld printer 100 over the area where the image is being projected, and depresses the print button 116. Since the image is locked, the image projected by the handheld printer 100 is adjusted 912 for movement of the handheld printer 100 so that the projected image is stationary (fixed) on the surface 104 as the handheld printer 100 moves. The handheld printer 100 continuously determines 914 its position based on information from the optical sensors 140, 142. As the handheld printer 100 is being moved, the processor 602 determines whether the position of the handheld printer 102 is over an area that has already been printed. If not, the method proceeds to activate 918 the print head 118 and print or output ink after which the method continues at step 920. If the handheld printer 100 is over an area that is already printed of the method proceeds directly from step 916 to step 920. In step 920, the method determines whether the entire image has been printed. If not the method returns to step 910 where the user continues to move the handheld printer 100 over the area where the image is projected. In one embodiment, the handheld printer 100 provides feedback on the display 122 let the user know whether or not the entire image has been printed. If the entire image has been printed, the method is complete and ends.

Those skilled in the art will recognize that the projection of the image to be printed is particularly advantageous. For example, the image may be partially printed and then the handheld printer 100 may be set aside temporarily. The use of the projection is advantageous in this instance because the handheld printer 100 is able to print the remainder of the image with ease. The user need only project the image and manually, visually align the projected image with the partially printed image and then print the remainder of the image. The use of projection makes the realignment process particularly simple since it is very easy for the user to discern differences between the partially printed image and the projected image and thereby obtain precise and exact alignment.

Also, the user need not print the entire image shown by the projection. Instead, the user may choose to actually print only a portion of the projected image, which means they choose to print only a portion of their document. Maybe only one part of the document is particularly interesting to them. In this case, the projected image serves to show the entire image to the user, allowing the user to align the portion they're interested in on their target surface, and the user only needs to move the printer across the area of particular interest. This can be considered "instant cropping" of printed images. The projected image, combined with the flexibility of the handheld printer, allows cropping of images without needing to preprocess the print image data in some editing tool, such as in programs like PhotoShop by Adobe Systems Incorporated, of San Jose, Calif.

Figure 10:
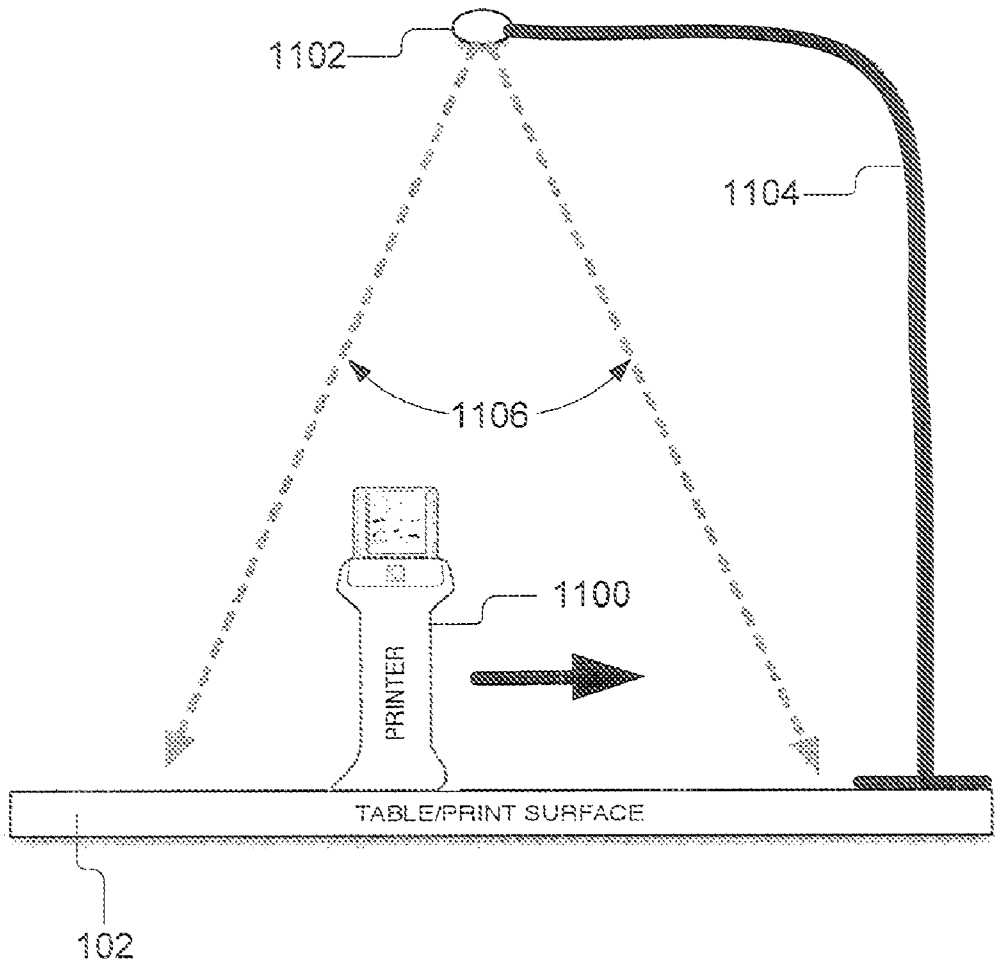
FIG. 10 is conceptual block diagram of a second embodiment of the handheld printer according to the present invention.

FIG. 10 shows a second embodiment of the handheld printer 1100 according to the present invention. In this second embodiment, the handheld printer 1100 does not include the projector. However, a projector 1102 is part of a desk or other structure of a room. The projector 1102 is coupled by a network 1104 to a communication device (not shown). The network 1104 is now the conventional type and could be connected for example to server (not shown). The handheld printer 1100 does include a communication module 618 as has been described above. The communication module 618 can send and receive information and commands to and from the projector 1102. The handheld printer 1100 uses the communication module to send an image to be printed to the network 1104 and in turn to the projector 1102. The projector 1102 receives and projects the image to produce projection 1106. The handheld printer 1100 is then moved across the print surface 104 as has been described above to print the image onto the surface 104. FIG. 10 illustrates one embodiment where the handheld printer 1100 can have a reduced number of components but accesses components of pre-existing infrastructure to enable handheld printing in accordance with the present invention. Those of ordinary skill in the art will recognize that there are a number of permutations as to which components can be part of the handheld printer 1100 or part of the pre-existing infrastructure. For example, the camera 616 might also be part of pre-existing infrastructure similar to the projector 1102.

In another embodiment of the present invention, the print head is able to output two types of ink, one visible to the naked eye, and one in another spectrum such as an ultraviolet light spectrum. Alternatively, there may be separate print heads for the different types of ink. Regardless, the print head under control of the processor 602 is capable of applying registration marks visible in an ultraviolet light spectrum to the surface 104. In one embodiment, the handheld printer 100 includes an ultraviolet light source that may selectively be activated to reveal the registration marks. In another embodiment, the room projector 1102 includes the ultraviolet light source that may selectively be activated (via communication between the handheld printer 1100 and the projector 1102) to reveal the registration marks The foregoing description of the embodiments of the present invention has been presented for the purposes of illustration and description. It is not intended to be exhaustive or to limit the present invention to the precise form disclosed. Many modifications and variations are possible in light of the above teaching. For example, the embodiments presented above with only one print head may be considered to be a monochrome printer (one color of ink). However, full color printing is possible by extending the presentation here to four print heads, as will be understood by those skilled in the art. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. An apparatus for printing a document, the apparatus comprising:

a handheld, portable housing;

a controller for controlling printing, the controller mounted to the portable housing;

a projector for projecting an image of the document to be printed and adjusting the projected image in response to movement of the apparatus, the projector mounted to the portable housing; and a print head for outputting ink in response to a signal from the controller, the print head mounted to the portable housing and coupled to the controller.

2. The apparatus of claim 1, wherein adjusting the projected image in response to movement of the apparatus includes resizing the image.

3. The apparatus of claim 1, further comprising a position detection sensor.

4. The apparatus of claim 3 wherein the position detection sensor is a plurality of optical sensors.

5. The apparatus of claim 1 wherein the portable housing forms a handle sized and shaped for grasping by the human hand.

6. The apparatus of claim 1, further comprising a battery for providing power to the controller and the print head, the battery housed in the portable housing and coupled for electrical communication with the controller and the print head.

7. The apparatus of claim 1, further comprising a consumable for use by the print head, the consumable housed in the portable housing and coupled to provide the consumable to the print head.

8. The apparatus of claim 1, further comprising a display device for displaying a second image of the document to be printed, the display device attached to the portable housing, and the display device adapted for communication with the controller.

9. The apparatus of claim 8 wherein the display device is attached to the portable housing such that the display device is movable from a first, retracted position to a second, operational position.

10. The apparatus of claim 1, further comprising an image capture device, the image capture device adapted for communication with the controller.

11. The apparatus of claim 10, wherein the image capture device is part of the apparatus and is mounted to the portable housing to capture an image of a surface upon which the apparatus is positioned.

12. The apparatus of claim 10, wherein the image capture device is external to the apparatus and mounted to capture an image of a surface upon which the apparatus is positioned.

13. The apparatus of claim 1, further comprising an input device for locking the projected image in a fixed position, the input device adapted for communication with the controller.

14. The apparatus of claim 1, further comprising an input device for causing the print head to output ink, the input device adapted for communication with the controller.

15. The apparatus of claim 1, further comprising an input device for adjusting the projection of the image to be printed, the input device adapted for communication with the controller.

16. The apparatus of claim 15, wherein the input device is a scroll dial to control the size of the projected image and the position of the projected image.

17. The apparatus of claim 13, further comprising a registration module for determining a portion of the projected image that has been printed in response to movement of the apparatus, the registration module coupled to the position detection sensor and responsive to the input device.

18. The apparatus of claim 14, further comprising a print module for causing ink to be output over unprinted areas of a surface, the print module adapted for communication with the input device, the controller and the print head.

19. The apparatus of claim 1, further comprising a communication interface, the communication interface adapted for communication with the controller.

20. The apparatus of claim 19, wherein the communication interface is one from the group of: a portable media device slot, a Bluetooth a transceiver, a radio frequency transceiver, a universal serial bus connector and a memory stick connector.

21. The apparatus of claim 1, wherein the print head is retractable from a first operating position to a second retracted position in which the print head is positioned entirely within the portable housing.

22. The apparatus of claim 11, further comprising an image processor to detect a portion of the image that has been printed, the image processor adapted for communication with the image capture device and the controller.

23. The apparatus of claim 1, wherein the portable housing is shaped such that the angle of the projector with respect to the surface remains fixed.

24. The apparatus of claim 1, wherein the ink output by the print head is conductive ink.

25. The apparatus of claim 1, wherein the print head and controller prints registration marks visible in an ultraviolet light spectrum, and the projector outputs ultraviolet light.

26. A method for printing with a handheld printer, the method comprising:

displaying, with the handheld printer, an image to be printed on a target surface;

detecting, with the handheld printer, movement of the handheld printer;

adjusting, with the handheld printer, the image in response to the movement; and outputting, with the handheld printer, ink in response to movement of the handheld printer.

27. The method of claim 26, wherein the step of adjusting the image further comprises resizing the display of the image in response to movement of the handheld printer.

28. The method of claim 26, wherein the step of displaying the image further comprises cropping display of the image.

29. The method of claim 26, further comprising capturing an image of a surface proximate the handheld printer.

30. The method of claim 29, further comprising determining a difference between a portion of an image that has been printed, and an original output image.

31. The method of claim 26, further comprising:

receiving input about a display characteristic of the displayed image; and modifying the display of the image in response to the input.

32. The method of claim 31 wherein the input about the display characteristic is received from a scroll wheel.

33. The method of claim 26, further comprising:

determining a portion of the displayed image that has been printed; and selectively controlling the outputting step to output ink over an area of the surface other than the portion.

34. The method of claim 26, further comprising receiving the image for the displaying step via a communication interface.

35. The method of claim 26, further comprising capturing the image to be printed using an image capture device.

36. The method of claim 26, wherein the outputting step includes printing a registration mark with invisible ink.

37. The method of claim 26, further comprising:

capturing a surface image of the target surface; and processing the surface image to control the outputting of ink.

38. The method of claim 26, further comprising:

moving the handheld printer away from the target surface; and re-registering the displaying of the image on the target surface.

* * * * *